United States Patent
Kaneichi

(10) Patent No.: US 11,588,895 B2
(45) Date of Patent: Feb. 21, 2023

(54) PROGRAM, CONTROL DEVICE, AND CONTROL METHOD FOR FACILITATING COMMUNICATION BETWEEN A VEHICLE USER AND A PARTNER ASSOCIATED WITH THE VEHICLE

(71) Applicant: Toyota Jidosha Kabushiki Kaisha, Toyota (JP)

(72) Inventor: Daiki Kaneichi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 17/167,552

(22) Filed: Feb. 4, 2021

(65) Prior Publication Data
US 2021/0258278 A1 Aug. 19, 2021

(30) Foreign Application Priority Data
Feb. 13, 2020 (JP) .............................. JP2020-022632

(51) Int. Cl.
*H04L 67/12* (2022.01)

(52) U.S. Cl.
CPC .................................. *H04L 67/12* (2013.01)

(58) Field of Classification Search
CPC ......... H04L 51/52; H04L 51/56; H04L 51/58; H04L 67/12; H04L 67/125; H04L 67/52; H04L 51/04; H04L 51/02; H04L 63/20; H04L 63/10; H04L 67/42; H04L 63/08; H04L 67/141; H04L 63/02; H04L 63/0876; H04W 12/06; H04W 12/08; H04W 12/00; G06F 21/6218; G06F 21/62; A61B 5/0022
See application file for complete search history.

(56) References Cited

U.S. PATENT DOCUMENTS

| 11,063,979 B1* | 7/2021 | Lunati ................. H04L 63/0853 |
| 11,074,655 B1* | 7/2021 | Davis ....................... G01S 15/04 |
| 11,138,310 B2* | 10/2021 | Wahler ................. G06F 21/554 |
| 2008/0015923 A1* | 1/2008 | Masaba ................... H04L 67/52 |
| | | 705/7.13 |
| 2010/0248618 A1* | 9/2010 | Bai ......................... H04W 4/46 |
| | | 455/11.1 |
| 2012/0290952 A1* | 11/2012 | Paluch ................ H04L 12/1818 |
| | | 715/758 |
| 2013/0145065 A1* | 6/2013 | Ricci ....................... G06V 20/59 |
| | | 710/241 |

(Continued)

FOREIGN PATENT DOCUMENTS

JP 2002-342426 A 11/2002

OTHER PUBLICATIONS

Jon Russell, "Line Launches A Taxi Booking Service In Japan Because Chat Apps Have Become Platforms" printed from techcrunch.com, Jan. 2015 (Year: 2015).*

(Continued)

*Primary Examiner* — David R Lazaro
(74) *Attorney, Agent, or Firm* — Dinsmore & Shohl LLP

(57) ABSTRACT

A user terminal is provided with a chat function for transmitting and receiving a message between a user and a registered chatting partner. The user terminal includes a control unit which allows the user, while the user is in a vehicle, to transmit and receive a message to and from a predetermined chatting partner associated with the vehicle.

20 Claims, 6 Drawing Sheets

(56) References Cited

U.S. PATENT DOCUMENTS

| | | | | |
|---|---|---|---|---|
| 2013/0203400 | A1* | 8/2013 | Ricci | G06F 11/2025 |
| | | | | 455/418 |
| 2014/0094143 | A1* | 4/2014 | Ayotte | G06Q 20/00 |
| | | | | 455/411 |
| 2016/0350882 | A1* | 12/2016 | Metcalfe | H04L 51/224 |
| 2017/0215031 | A1* | 7/2017 | Harding | G01C 21/3667 |
| 2018/0089783 | A1* | 3/2018 | Manzoor | G06Q 50/188 |
| 2018/0144322 | A1* | 5/2018 | Unnerstall | G07F 13/025 |
| 2018/0309801 | A1* | 10/2018 | Rathod | H04M 3/5175 |
| 2019/0188590 | A1* | 6/2019 | Wu | H04L 51/02 |
| 2019/0311417 | A1* | 10/2019 | Randisi | G06Q 50/30 |
| 2019/0394159 | A1* | 12/2019 | Gosalia | H04W 76/14 |
| 2020/0162859 | A1* | 5/2020 | Mitra | H04W 4/12 |
| 2020/0283005 | A1* | 9/2020 | Shah | B60H 3/0035 |
| 2021/0042724 | A1* | 2/2021 | Rathod | G07F 9/026 |
| 2021/0056555 | A1* | 2/2021 | Kurylko | G06Q 20/308 |
| 2021/0075748 | A1* | 3/2021 | Agarwal | G06F 3/04883 |
| 2021/0114616 | A1* | 4/2021 | Altman | H04W 36/00837 |
| 2021/0209293 | A1* | 7/2021 | Varma | G06Q 30/0613 |
| 2021/0218812 | A1* | 7/2021 | Vassilovski | H04W 4/029 |
| 2021/0258278 | A1* | 8/2021 | Kaneichi | H04L 51/046 |
| 2021/0334068 | A1* | 10/2021 | Rangaraju | G06F 3/04817 |
| 2022/0159432 | A1* | 5/2022 | Crawford | H04W 4/80 |

OTHER PUBLICATIONS

Emma Lee, "WeChat Adds Taxi-booking App Didi Dache" printed from technode.com, Jan. 2014 (Year: 2014).*

Weng et al. "Improving Driver Communication through One-Click Chat, Uber's Smart Reply System—Uber Engineering Blog" printed from uber.com Sep. 2018 (Year: 2018).*

Jeremy Lermitte, "Connect Ahead of the Pickup with In-App Chat | Uber Newsroom" Aug. 10, 2017, printed from uber.com (Year: 2017).*

* cited by examiner

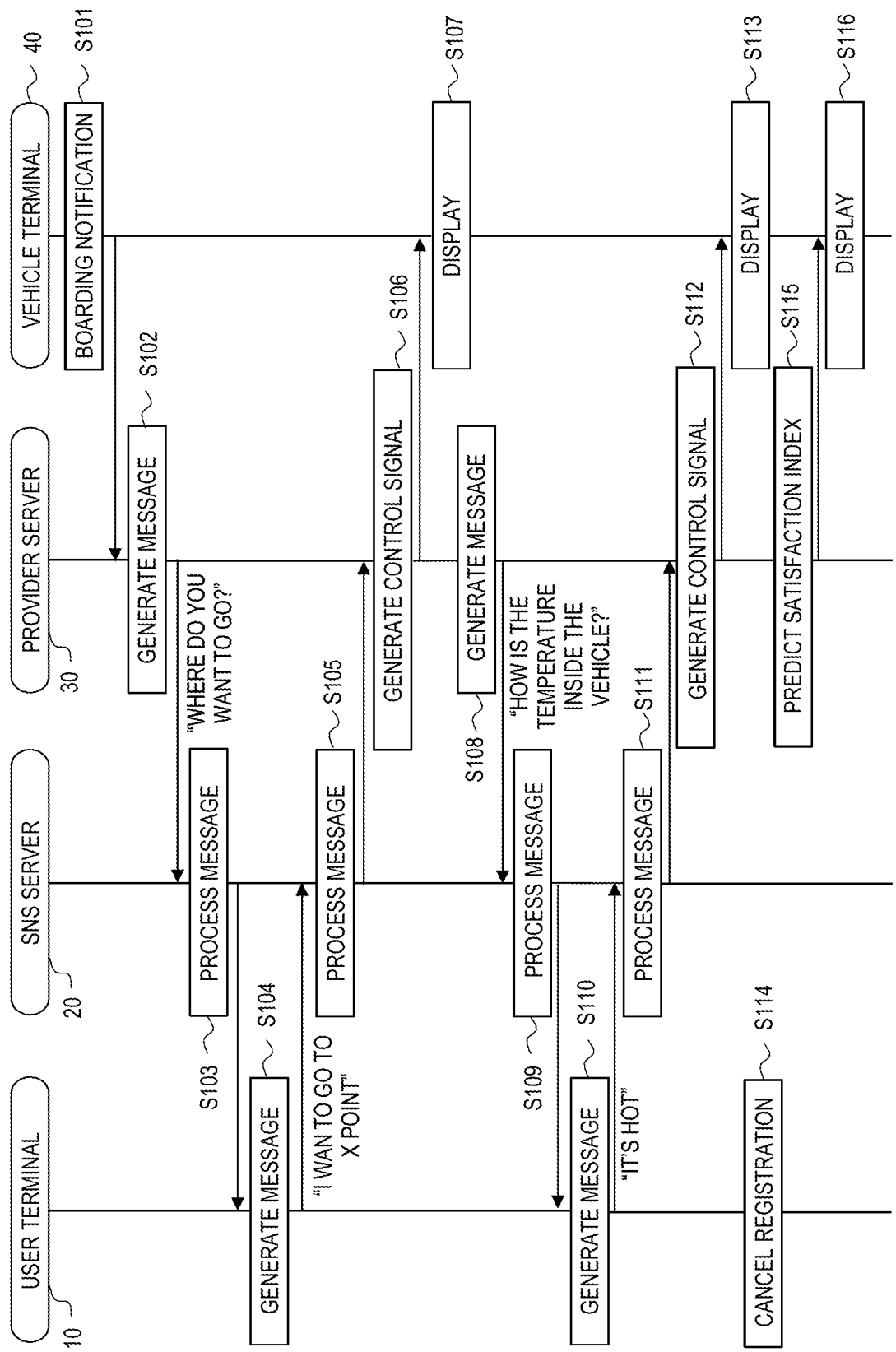

PROGRAM, CONTROL DEVICE, AND CONTROL METHOD FOR FACILITATING COMMUNICATION BETWEEN A VEHICLE USER AND A PARTNER ASSOCIATED WITH THE VEHICLE

CROSS-REFERENCE TO RELATED APPLICATION

This application claims priority to Japanese Patent Application No. 2020-022632 filed on Feb. 13, 2020, incorporated herein by reference in its entirety.

BACKGROUND

1. Technical Field

The present disclosure relates to a program, a control device, and a control method.

2. Description of Related Art

Japanese Unexamined Patent Application Publication No. 2002-342426 describes a technology for allocating a taxi via a communication line so as to provide an onboard service to a user.

SUMMARY

However, the related art does not provide sufficient convenience in terms of an onboard service.

The present disclosure is intended to enhance the convenience of an onboard service.

A program according to the present disclosure causes a computer used by a user to execute an operation including providing a chat function for transmitting and receiving a message between the user and a registered chatting partner and allowing the user, while the user is in a vehicle, to transmit and receive a message to and from a predetermined chatting partner, who is associated with the vehicle, by using the chat function.

A control device according to the present disclosure includes a control unit and a communication unit. The control unit is configured to, while a user is in a vehicle, transmit a control signal to a vehicle terminal used in the vehicle or to the vehicle, via the communication unit. The control signal is generated based on a message transmitted, while a user is in a vehicle, from the user to a predetermined chatting partner associated with the vehicle.

A control method according to the present disclosure is executed by a computer used by a user. The control method includes a step of providing a chat function for transmitting and receiving a message between the user and a registered chatting partner and a step of allowing the user, while the user is in a vehicle, to transmit and receive a message to and from a predetermined chatting partner, who is associated with the vehicle, by using the chat function.

With each aspect of the present disclosure, the convenience of an onboard service can be enhanced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram illustrating an operation of the control system according to the embodiment.

DETAILED DESCRIPTION OF EMBODIMENTS

Hereinafter, an embodiment will be described with reference to the drawings.

In each of the drawings, the same or equivalent components are denoted by the same reference signs. For the description of the present embodiment, the descriptions of the same or equivalent components will be appropriately omitted or simplified.

Figure 1:
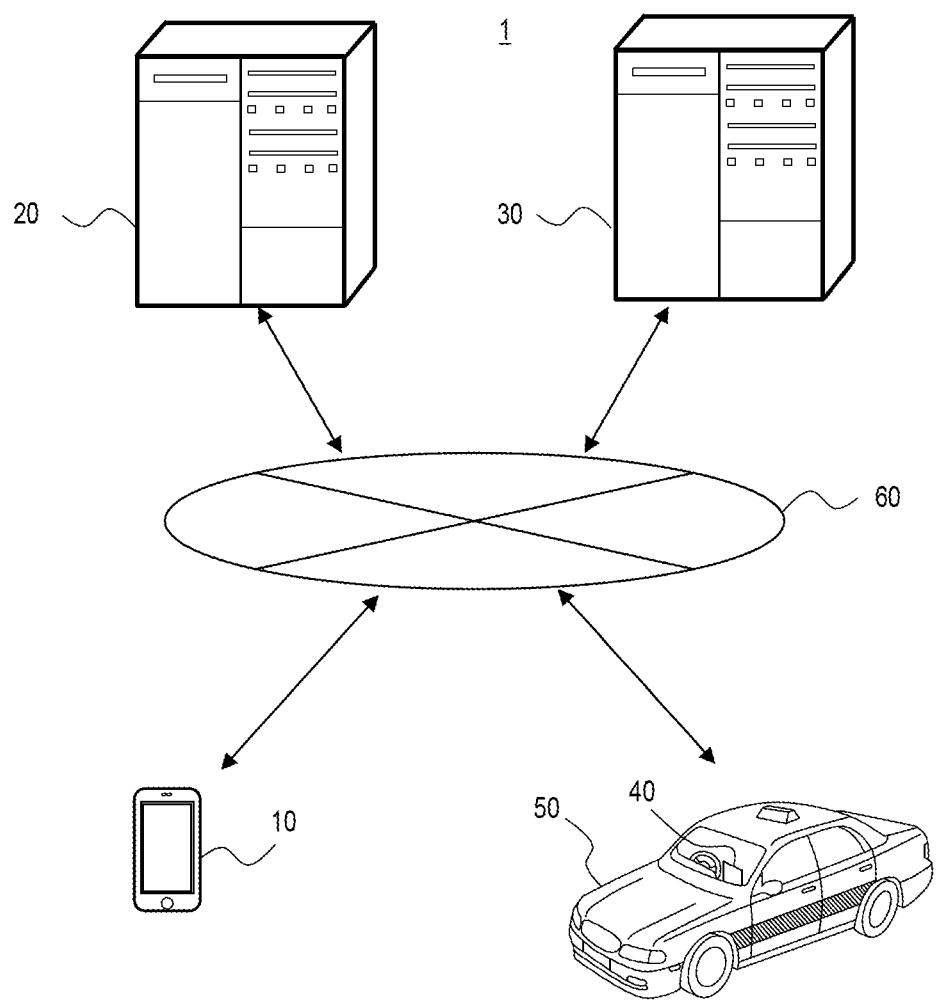
FIG. 1 is a diagram illustrating a configuration of a control system according to an embodiment.

A configuration of a control system 1 according to the present embodiment will be described with reference to FIG. 1.

The control system 1 includes at least one user terminal 10, at least one SNS server 20, at least one provider server 30, at least one vehicle terminal 40, and at least one vehicle 50. "SNS" is an abbreviation for a social networking service.

The user terminal 10 can communicate with the SNS server 20, the provider server 30, and the vehicle terminal 40 via a network 60, such as a mobile communication network or the internet. The user terminal 10 may be capable of communicating with the vehicle 50 via the network 60.

The SNS server 20 can communicate with the user terminal 10, the provider server 30, and the vehicle terminal 40 via the network 60. The SNS server 20 may be capable of communicating with the vehicle 50 via the network 60.

The provider server 30 can communicate with the user terminal 10, the SNS server 20, and the vehicle terminal 40 via the network 60. The provider server 30 may be capable of communicating with the vehicle 50 via the network 60.

The vehicle 50 is a taxi in the present embodiment, but may be an automobile other than a taxi such as an on-demand bus as long as it can pick up and drop off at least one user. The vehicle 50 may be, for example, a gasoline vehicle, a diesel vehicle, an HV, a PHV, an EV, an FCV, or any other type of vehicle. "HV" is an abbreviation for a hybrid vehicle. "PHV" is an abbreviation for a plug-in hybrid vehicle. "EV" is an abbreviation for an electric vehicle. "FCV" is an abbreviation for a fuel cell vehicle. The vehicle 50 is driven by a driver in the present embodiment, but may be automatically driven to any level of driving automation. The driving automation level may be, for example, any of level 1 to level 5 according to the SAE level classification. "SAE" is an abbreviation for "Society of Automotive Engineers". The vehicle 50 may be a MaaS vehicle. "MaaS" is an abbreviation for "Mobility as a Service".

The vehicle terminal 40 can communicate with the user terminal 10, the SNS server 20, and the provider server 30 via the network 60. The vehicle terminal 40 may be capable of communicating with the vehicle 50 via the network 60.

An outline of the present embodiment will be described with reference to FIG. 1.

The user terminal 10 according to the present embodiment allows the user, while the user is in the vehicle 50, to transmit and receive a message to and from a predetermined chatting partner associated with the vehicle 50, by using the chat function for transmitting and receiving the message between the user and the registered chatting partner.

In the present embodiment, while the user is in the vehicle 50, the user can issue a request for the onboard service to, for example, a driver of the vehicle 50, by using the chat function of transmitting and receiving the message between the user and the registered chatting partner. Consequently, the convenience of the onboard service can be enhanced.

Figure 2:
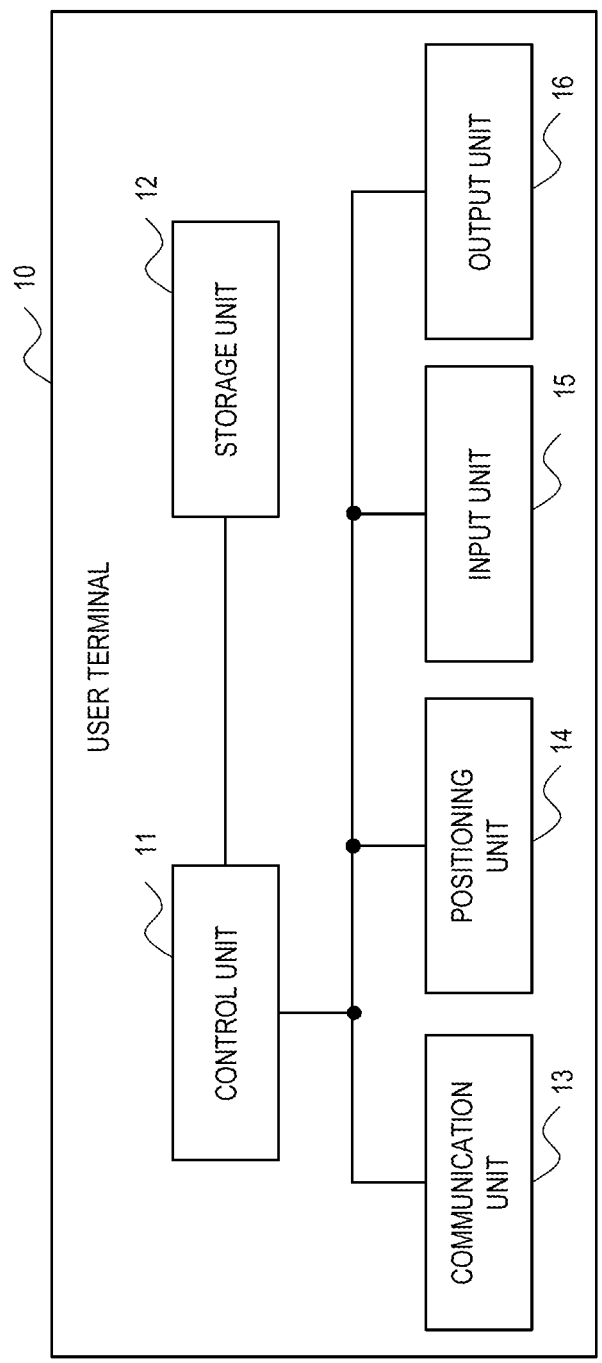
FIG. 2 is a diagram illustrating a configuration of a user terminal according to the embodiment.

A configuration of the user terminal 10 according to the present embodiment will be described with reference to FIG. 2. The user terminal 10 may be, for example, a mobile phone, a smartphone, a tablet, or a PC. "PC" is an abbreviation for a personal computer.

The user terminal 10 includes a control unit 11, a storage unit 12, a communication unit 13, a positioning unit 14, an input unit 15, and an output unit 16.

The control unit 11 includes one or more processors, or one or more dedicated circuits, or a combination thereof. The processor is a general-purpose processor (such as a CPU) or a dedicated processor specialized for specific processing. "CPU" is an abbreviation for a central processing unit. The dedicated circuit may be, for example, an FPGA or an ASIC. "FPGA" is an abbreviation for a field-programmable gate array. "ASIC" is an abbreviation for an application specific integrated circuit. The control unit 11 executes information processing related to the operation of the user terminal 10 while controlling each unit of the user terminal 10.

The storage unit 12 includes one or more semiconductor memories, one or more magnetic memories, one or more optical memories, or a combination of at least two of these memory types. The semiconductor memory may be, for example, a RAM or a ROM. "RAM" is an abbreviation for a random access memory. "ROM" is an abbreviation for a read-only memory. The RAM may be, for example, an SRAM or a DRAM. "SRAM" is an abbreviation for a static random access memory. "DRAM" is an abbreviation for a dynamic random access memory. The ROM may be, for example, an EEPROM. "EEPROM" is an abbreviation for an electrically erasable programmable read-only memory. The storage unit 12 may function as, for example, a main storage device, an auxiliary storage device, or a cache memory. The storage unit 12 stores information used for the operation of the user terminal 10, and information acquired by the operation of the user terminal 10.

The communication unit 13 includes one or more communication interfaces. The communication interface may be, for example, an interface corresponding to a mobile communication standard, such as LTE, 4G or 5G, or a LAN interface. "LTE" is an abbreviation for Long Term Evolution. "4G" is an abbreviation for Fourth generation. "5G" is an abbreviation for Fifth generation. "LAN" is an abbreviation for a local area network. The communication unit 13 receives the information used for the operation of the user terminal 10, and transmits the information acquired by the operation of the user terminal 10.

The positioning unit 14 includes one or more GNSS receivers. "GNSS" is an abbreviation for a global navigation satellite system. The GNSS includes, for example, at least one of GPS, QZSS, GLONASS, and Galileo. "GPS" is an abbreviation for a Global Positioning System. "QZSS" is an abbreviation for a Quasi-Zenith Satellite System. QZSS satellites are referred to as quasi-zenith satellites. "GLONASS" is an abbreviation for a Global Navigation Satellite System. The positioning unit 14 acquires location information of the user terminal 10 as location information of the user.

The input unit 15 includes one or more input interfaces. The input interface may be, for example, a physical key, a capacitance key, a pointing device, a touch screen integrated with a display, or a microphone. The input unit 15 receives the input information used for the operation of the user terminal 10. The input unit 15 may be connected to the user terminal 10 as an external input device instead of being provided in the user terminal 10. Any method, such as USB, HDMI® or Bluetooth®, may be used as the connection method. "USB" is an abbreviation for a universal serial bus. "HDMI®" is an abbreviation for a High-Definition Multimedia Interface.

The output unit 16 includes one or more output interfaces. The output interface may be, for example, a display or a speaker. The display may be, for example, an LCD or an organic EL display. "LCD" is an abbreviation for a liquid crystal display. "EL" is an abbreviation for electroluminescence. The output unit 16 outputs the information acquired by the operation of the user terminal 10. The output unit 16 may be connected to the user terminal 10 as an external output device instead of being provided in the user terminal 10. Any method, such as USB, HDMI® or Bluetooth®, may be used as the connection method.

The function of the user terminal 10 is implemented by executing a user terminal program according to the present embodiment with the processor included in the control unit 11. In other words, the function of the user terminal 10 is implemented by software. The user terminal program is a program for causing the computer to execute processing a step included in the operation of the user terminal 10 such that the computer implements the function corresponding to the processing of the step. That is, the user terminal program is a program for causing the computer to function as the user terminal 10.

The program can be recorded in a computer-readable non-transitory storage medium. The computer-readable non-transitory storage medium may be, for example, a magnetic recording device, an optical disc, a magneto-optical recording medium, or a semiconductor memory. The program may be distributed by, for example, selling, transferring, or lending a portable storage medium, such as a DVD or a CD-ROM in which the program is recorded. "DVD" is an abbreviation for a digital versatile disc. "CD-ROM" is an abbreviation for a compact disc read-only memory. The program may be stored in a storage of the server and transferred from the server to another computer so as to distribute the program. The program may be provided as a program product.

The computer temporarily stores the program recorded in the portable storage medium or the program transferred from the server, for example, in the main storage device. Then, the computer causes the processor to read the program stored in the main storage device, and causes the processor to execute processing according to the read program. The computer may read the program directly from the portable storage medium and execute processing according to the program. The computer may sequentially execute the processing according to the received program each time the program is transferred from the server to the computer. Instead of transferring the program from the server to the computer, the processing may be executed by a so-called ASP service that implements the function only by providing instruction on the execution, and obtaining the result. "ASP" is an abbreviation for an application service provider. The program includes information used for processing by an electronic computer, which is equivalent to the program. For example, data that is not a direct command to a computer but has the property of defining the processing of the computer corresponds to "equivalent to the program".

Some or all of the functions of the user terminal 10 may be implemented by the dedicated circuit included in the control unit 11. In other words, some or all of the functions of the user terminal 10 may be implemented by hardware.

Figure 3:
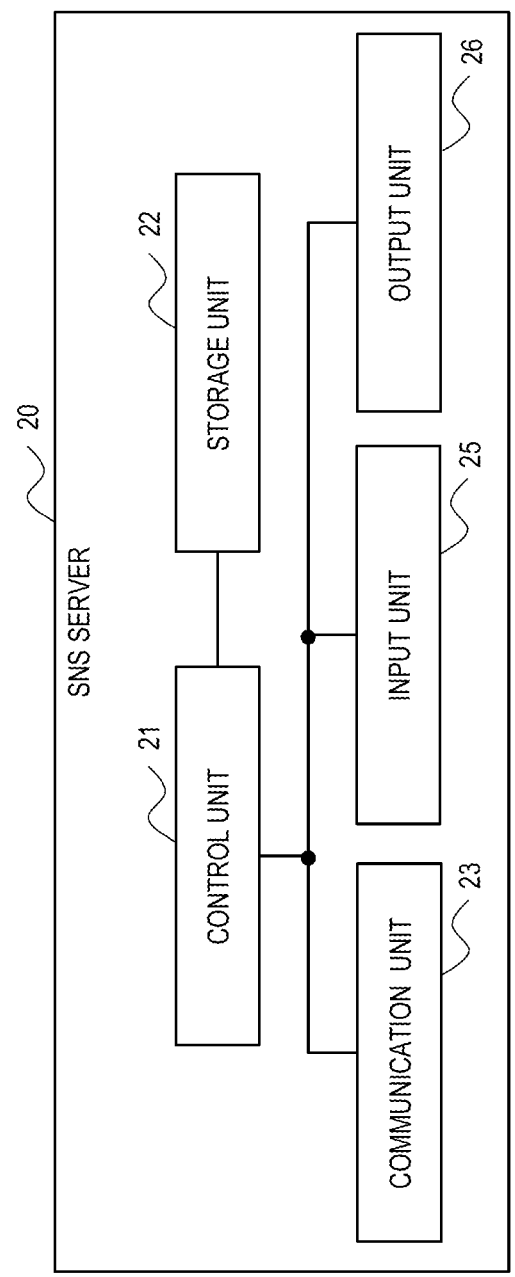
FIG. 3 is a diagram illustrating a configuration of a social network service (SNS) server according to the embodiment.

A configuration of the SNS server 20 according to the present embodiment will be described with reference to FIG. 3.

The SNS server 20 may be, for example, a server included in a cloud computing system or another computing system.

The SNS server 20 includes a control unit 21, a storage unit 22, a communication unit 23, an input unit 25, and an output unit 26.

The control unit 21 includes one or more processors, one or more dedicated circuits, or a combination thereof. The processor is a general-purpose processor (such as a CPU) or a dedicated processor specialized for specific processing. The dedicated circuit may be, for example, an FPGA or an ASIC. The control unit 21 executes information processing related to the operation of the SNS server 20 while controlling each unit of the SNS server 20.

The storage unit 22 includes one or more semiconductor memories, one or more magnetic memories, one or more optical memories, or a combination of at least two of these memory types. The semiconductor memory may be, for example, a RAM or a ROM. The RAM may be, for example, an SRAM or a DRAM. The ROM may be, for example, an EEPROM. The storage unit 22 may function as, for example, a main storage device, an auxiliary storage device, or a cache memory. The storage unit 22 stores information used for the operation of the SNS server 20 and information acquired by the operation of the SNS server 20.

The communication unit 23 includes one or more communication interfaces. The communication interface may be, for example, a LAN interface. The communication unit 23 receives the information used for the operation of the SNS server 20, and transmits the information acquired by the operation of the SNS server 20.

The input unit 25 includes one or more input interfaces. The input interface may be, for example, a physical key, a capacitance key, a pointing device, a touch screen integrated with a display, or a microphone. The input unit 25 receives the input information used for the operation of the SNS server 20. The input unit 25 may be connected to the SNS server 20 as an external input device instead of being provided in the SNS server 20. Any method, such as USB, HDMI® or Bluetooth®, may be used as the connection method.

The output unit 26 includes one or more output interfaces. The output interface may be, for example, a display or a speaker. The display may be, for example, an LCD or an organic EL display. The output unit 26 outputs the information acquired by the operation of the SNS server 20. The output unit 26 may be connected to the SNS server 20 as an external output device instead of being provided in the SNS server 20. Any method, such as USB, HDMI® or Bluetooth®, may be used as the connection method.

The function of the SNS server 20 is implemented by executing a control program according to the present embodiment with the processor included in the control unit 21. In other words, the function of the SNS server 20 is implemented by software. The control program is a program for causing the computer to execute processing a step included in the operation of the SNS server 20 such that the computer implements the function corresponding to the processing of the step. That is, the control program is a program for causing the computer to function as the SNS server 20.

Some or all of the functions of the SNS server 20 may be implemented by the dedicated circuit included in the control unit 21. In other words, some or all of the functions of the SNS server 20 may be implemented by hardware.

Figure 4:
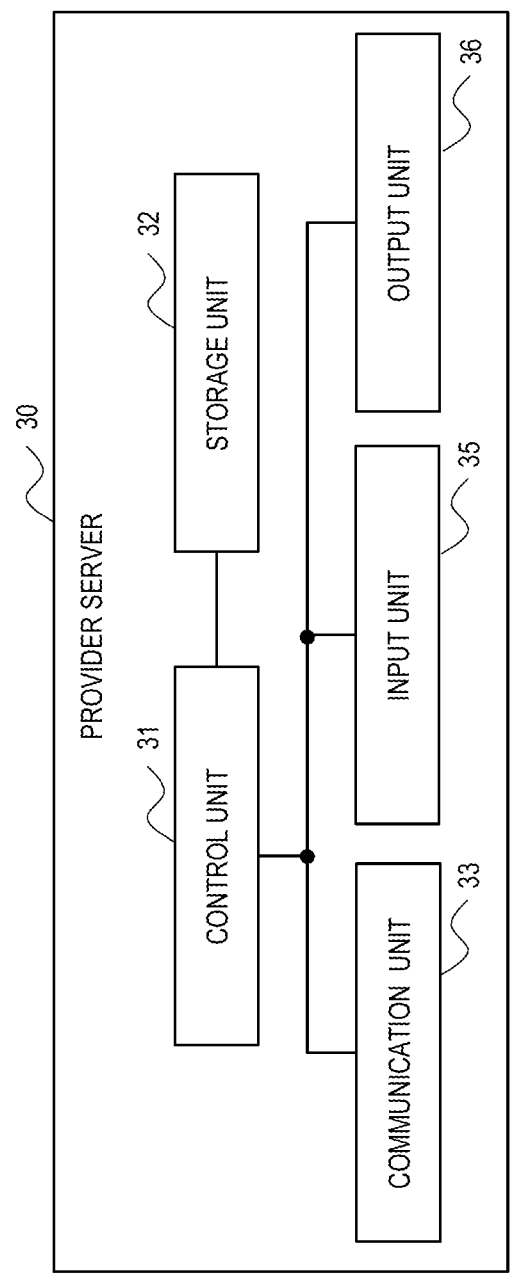
FIG. 4 is a diagram illustrating a configuration of a provider server according to the embodiment.

A configuration of the provider server 30, which corresponds to the control device according to the present embodiment, will be described with reference to FIG. 4.

The provider server 30 may be, for example, a server included in a cloud computing system or another computing system.

The provider server 30 includes a control unit 31, a storage unit 32, a communication unit 33, an input unit 35, and an output unit 36.

The control unit 31 includes one or more processors, one or more dedicated circuits, or a combination thereof. The processor is a general-purpose processor (such as a CPU) or a dedicated processor specialized for specific processing. The dedicated circuit may be, for example, an FPGA or an ASIC. The control unit 31 executes information processing related to the operation of the provider server 30 while controlling each unit of the provider server 30.

The storage unit 32 includes one or more semiconductor memories, one or more magnetic memories, one or more optical memories, or a combination of at least two of these memory types. The semiconductor memory may be, for example, a RAM or a ROM. The RAM may be, for example, an SRAM or a DRAM. The ROM may be, for example, an EEPROM. The storage unit 32 functions as, for example, a main storage device, an auxiliary storage device, or a cache memory. The storage unit 32 stores information used for the operation of the provider server 30 and information acquired by the operation of the provider server 30.

The communication unit 33 includes one or more communication interfaces. The communication interface may be, for example, a LAN interface. The communication unit 33 receives the information used for the operation of the provider server 30, and transmits the information acquired by the operation of the provider server 30.

The input unit 35 includes one or more input interfaces. The input interface may be, for example, a physical key, a capacitance key, a pointing device, a touch screen integrated with a display, or a microphone. The input unit 35 receives the input information used for the operation of the provider server 30. The input unit 35 may be connected to the provider server 30 as an external input device instead of being provided in the provider server 30. Any method, such as USB, HDMI® or Bluetooth®, may be used as the connection method.

The output unit 36 includes one or more output interfaces. The output interface may be, for example, a display or a speaker. The display may be, for example, an LCD or an organic EL display. The output unit 36 outputs the information acquired by the operation of the provider server 30. The output unit 36 may be connected to the provider server 30 as an external output device instead of being provided in the provider server 30. Any of method, such as USB, HDMI® or Bluetooth®, may be used as the connection method.

The function of the provider server 30 is implemented by executing a control program according to the present embodiment with the processor included in the control unit 31. In other words, the function of the provider server 30 is implemented by software. The control program is a program for causing the computer to execute processing a step included in the operation of the provider server 30 such that the computer implements the function corresponding to the processing of the step. That is, the control program is a program for causing the computer to function as the provider server 30.

Some or all of the functions of the provider server 30 may be implemented by the dedicated circuit included in the control unit 31. In other words, some or all of the functions of the provider server 30 may be implemented by hardware.

Figure 5:
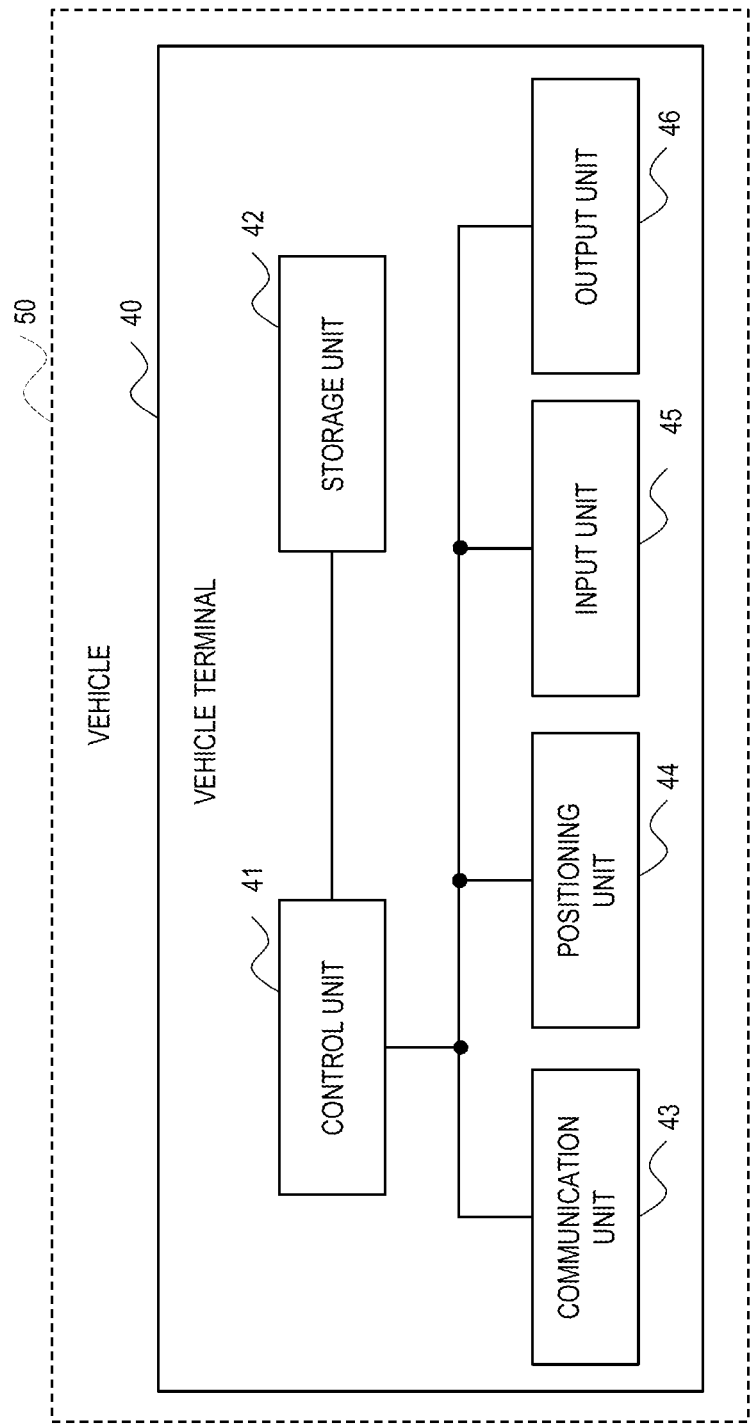
FIG. 5 is a diagram illustrating a configuration of a vehicle terminal according to the embodiment.

A configuration of the vehicle terminal 40 used in the vehicle 50 according to the present embodiment will be described with reference to FIG. 5.

The vehicle terminal 40 may be, for example, a car navigation device, a mobile phone, a smartphone, a tablet, or a PC. The vehicle terminal 40 may be configured integrally with the vehicle 50.

The vehicle terminal 40 includes a control unit 41, a storage unit 42, a communication unit 43, a positioning unit 44, an input unit 45, and an output unit 46.

The control unit 41 includes one or more processors, one or more dedicated circuits, or a combination thereof. The processor is a general-purpose processor (such as a CPU) or a dedicated processor specialized for specific processing. The dedicated circuit may be, for example, an FPGA or an ASIC. The control unit 41 executes information processing related to the operation of the vehicle terminal 40 while controlling each unit of the vehicle terminal 40.

The storage unit 42 includes one or more semiconductor memories, one or more magnetic memories, one or more optical memories, or a combination of at least two of these memory types. The semiconductor memory may be, for example, a RAM or a ROM. The RAM may be, for example, an SRAM or a DRAM. The ROM may be, for example, an EEPROM. The storage unit 42 functions as, for example, a main storage device, an auxiliary storage device, or a cache memory. The storage unit 42 stores information used for the operation of the vehicle terminal 40 and information acquired by the operation of the vehicle terminal 40.

The communication unit 43 includes one or more communication interfaces. The communication interface may be, for example, an interface corresponding to a mobile communication standard such as LTE, 4G, or 5G. The communication unit 43 receives the information used for the operation of the vehicle terminal 40, and transmits the information acquired by the operation of the vehicle terminal 40.

The positioning unit 44 includes one or more GNSS receivers. The GNSS includes, for example, at least one of GPS, QZSS, GLONASS, and Galileo. The positioning unit 44 acquires location information of the vehicle 50.

The input unit 45 includes one or more input interfaces. The input interface may be, for example, a physical key, a capacitance key, a pointing device, a touch screen integrated with a display, or a microphone. The input unit 45 receives the input information used for the operation of the vehicle terminal 40. The input unit 45 may be connected to the vehicle terminal 40 as an external input device instead of being provided in the vehicle terminal 40. Any method, such as USB, HDMI® or Bluetooth®, may be used as the connection method.

The output unit 46 includes one or more output interfaces. The output interface may be, for example, a display or a speaker. The display may be, for example, an LCD or an organic EL display. The output unit 46 outputs the information acquired by the operation of the vehicle terminal 40. The output unit 46 may be connected to the vehicle terminal 40 as an external output device (e.g., display audio) instead of being provided in the vehicle terminal 40. Any method, such as USB, HDMI® or Bluetooth®, may be used as the connection method.

The function of the vehicle terminal 40 is implemented by executing a vehicle terminal program according to the present embodiment with the processor included in the control unit 41. In other words, the function of the vehicle terminal 40 is implemented by software. The vehicle terminal program is a program for causing the computer to execute processing a step included in the operation of the vehicle terminal 40 such that the computer implements the function corresponding to the processing of the step. That is, the vehicle terminal program is a program for causing the computer to function as the vehicle terminal 40.

Some or all of the functions of the vehicle terminal 40 may be implemented by the dedicated circuit included in the control unit 41. In other words, some or all of the functions of the vehicle terminal 40 may be implemented by hardware.

An operation of the control system 1 according to the present embodiment will be described with reference to FIG. 6. This operation corresponds to the control method according to present embodiment.

As an example, the user terminal 10 is provided with a chat function for transmitting and receiving a message between the user and the registered chatting partner on the SNS. Further, the user boards the vehicle 50, and the chatting partner includes a dialogue agent of the vehicle 50 or a dialogue agent of a business operator who provides a service for dispatching of the vehicle 50. The user may read, for example, a QR Code® including identification information on the SNS, of the dialogue agent of the vehicle 50 or the dialogue agent of the business operator who provides the service for dispatching the vehicle 50, which is displayed on a screen of the vehicle terminal 40, displayed on a screen of another terminal used in the vehicle 50, or printed on a sticker attached inside the vehicle 50, using a camera mounted on or connected to the user terminal 10. Accordingly, the user can register the dialogue agent of the vehicle 50 or the dialogue agent of the business operator who provides the service for dispatching the vehicle 50 as the chatting partner. However, the present disclosure is not limited thereto, and the user can register, as the chatting partner, the dialogue agent of the vehicle 50 or the dialogue agent of the business operator who provides the service for dispatching the vehicle 50 by any method.

In step S101, the control unit 41 of the vehicle terminal 40 transmits a search signal for searching for the user terminal 10 using the communication unit 43. When the control unit 41 detects the user terminal 10, the control unit 41 generates, by using the communication unit 43, a boarding notification indicating that the user has boarded the vehicle 50. The control unit 41 transmits the generated boarding notification to the provider server 30 via the communication unit 43.

In this example, the control unit 41 of the vehicle terminal 40 transmits the search signal, such as a beacon, via the communication unit 43, using a technology such as Bluetooth® or Wi-Fi, thereby detecting the user terminal 10. When the control unit 41 detects the user terminal 10, the control unit 41 generates, by using the communication unit 43, a boarding notification indicating that the user has boarded the vehicle 50. The control unit 41, by using the communication unit 43, may include the information on a set language of the user terminal 10 acquired from the user terminal 10 in the boarding notification.

In step S102, the control unit 31 of the provider server 30 receives the boarding notification transmitted in step S101 via the communication unit 33. The control unit 31 generates a message for asking the user to confirm a request regarding a destination. The control unit 31 transmits the generated message to the SNS server 20 via the communication unit 33.

In this example, the control unit 31 of the provider server 30 transmits, to the SNS server 20, a message including the text "Where do you want to go?", via the communication unit 33. The control unit 31 may match the language of the message to be transmitted with the set language of the user terminal 10 based on the information on the set language of the user terminal 10 included in the boarding notification.

In step S103, the control unit 21 of the SNS server 20 receives the message transmitted in step S102 via the communication unit 23. The control unit 21 executes the same processing as for an existing SNS on the received message. The control unit 21 transmits the processed message to the user terminal 10 via the communication unit 23.

In this example, the control unit 21 of the SNS server 20 transmits, to the user terminal 10, the message including the text "Where do you want to go?", via the communication unit 23. In this example, the user terminal 10 and the provider server 30 transmit and receive the message via the SNS server 20, but may directly transmit and receive the message without transmitting and receiving the message through the SNS server 20.

In step S104, the control unit 11 of the user terminal 10 receives the message transmitted in step S103 via the communication unit 13. The control unit 11, by the output unit 16, displays the received message on the screen or outputs the message by voice. The control unit 11 of the user terminal 10 receives, by the input unit 15, a reply made by the user, to the received message. The control unit 11 generates the message indicating the reply to the received message. The control unit 11 transmits the generated message to the SNS server 20 via the communication unit 13.

In this example, the control unit 11 of the user terminal 10, by the output unit 16, displays the message including the text "Where do you want to go?" on the screen. Further, the control unit 11, by the output unit 16, may output the message by voice, instead of displaying the message on the screen. The user inputs the text "I want to go to X point" into the user terminal 10. The control unit 11 of the user terminal 10 transmits a message including the text "I want to go to X point" to the SNS server 20 via the communication unit 13.

In step S105, the control unit 21 of the SNS server 20 receives the message transmitted in step S104 via the communication unit 23. The control unit 21 executes the same processing as for an existing SNS on the received message. The control unit 21 transmits the processed message to the provider server 30 via the communication unit 23.

In this example, the control unit 21 of the SNS server 20 transmits the message including the text "I want to go to X point" to the provider server 30 via the communication unit 23. Further, the user terminal 10 and the provider server 30 may transmit and receive the message via the SNS server 20, but may directly transmit and receive the message without transmitting and receiving the message through the SNS server 20.

In step S106, the control unit 31 of the provider server 30 receives the message transmitted in step S105 via the communication unit 33. The control unit 31 predicts the destination desired by the user from the received message. The control unit 31 generates a control signal for the control unit 41 of the vehicle terminal 40 so as to, by the output unit 46, display information indicating the user's destination on the screen or output the information by voice. The control unit 31 transmits the generated control signal to the vehicle terminal 40 via the communication unit 33.

In this example, the control unit 31 of the provider server 30 predicts that the destination desired by the user is X point from the message including the text "I want to go to X point". The control unit 31, by the output unit 46, generates a control signal for the control unit 41 of the vehicle terminal 40 to display the X point on a map or output a name of the X point by voice. The control unit 31 transmits the generated control signal to vehicle terminal 40 via the communication unit 33.

In step S107, the control unit 41 of the vehicle terminal 40 receives the control signal transmitted in step S106 via the communication unit 43. The control unit 41, by the output unit 46, displays the information indicating the user's destination on the screen or outputs the information by voice.

In this example, the control unit 41 of the vehicle terminal 40, by the output unit 46, displays the X point on the map or outputs the name of the X point by voice. Consequently, the driver of the vehicle 50 can recognize the X point, which is the user's destination.

In step S108, the control unit 31 of the provider server 30 generates a message asking the user whether he/she has a request for the temperature inside the vehicle 50. The control unit 31 transmits the generated message to the SNS server 20 via the communication unit 33. The user request may be any request as long as it is a request regarding the environment of an inside of the vehicle 50. For example, the request regarding the environment inside the vehicle 50 may be a request regarding humidity, air volume, or wind direction inside the vehicle 50, in addition to the request regarding temperature inside the vehicle 50.

In this example, the control unit 31 of the provider server 30 transmits a message including the text "How is the temperature inside the vehicle?" to the SNS server 20 via the communication unit 33.

In step S109, the control unit 21 of the SNS server 20 receives the message transmitted in step S108 via the communication unit 23. The control unit 21 executes the same processing as for an existing SNS on the received message. The control unit 21 transmits the processed message to the user terminal 10 via the communication unit 23.

In this example, the control unit 21 of the SNS server 20 transmits the message including the text "How is the temperature inside the vehicle?" to the user terminal 10 via the communication unit 23. Further, the user terminal 10 and the provider server 30 transmit and receive the message via the SNS server 20, but may directly transmit and receive the message without transmitting and receiving the message through the SNS server 20.

In step S110, the control unit 11 of the user terminal 10 receives the message transmitted in step S109 via the communication unit 13. The control unit 11, by the output unit 16, displays the received message on the screen or outputs the message by voice. The control unit 11 of the user terminal 10 receives, by the input unit 15, a reply, made by the user, to the received message. The control unit 11 generates the message indicating the reply to the received message. The control unit 11 transmits the generated message to the SNS server 20 via the communication unit 13.

In this example, the control unit 11 of the user terminal 10, by the output unit 16, displays the message including the text "How is the temperature inside the vehicle?" on the screen. Further, the control unit 11, by the output unit 16, may output the message by voice, instead of displaying the message on the screen. The user inputs the text "It's hot."

into the user terminal 10. The control unit 11 of the user terminal 10 transmits a message including the text "It's hot." to the SNS server 20 via the communication unit 13.

In step S111, the control unit 21 of the SNS server 20 receives the message transmitted in step S110 via the communication unit 23. The control unit 21 executes the same processing as for an existing SNS on the received message. The control unit 21 transmits the processed message to the provider server 30 via the communication unit 23.

In this example, the control unit 21 of the SNS server 20 transmits the message including the text "It's hot." to the provider server 30 via the communication unit 23. Further, the user terminal 10 and the provider server 30 transmit and receive the message via the SNS server 20, but may directly transmit and receive the message without transmitting and receiving the message through the SNS server 20.

In step S112, the control unit 31 of the provider server 30 receives the message transmitted in step S111 via the communication unit 33. The control unit 31 determines the temperature that the user desires for the inside of the vehicle 50, from the received message. The control unit 31 generates a control signal for the control unit 41 of the vehicle terminal 40 so as to, by the output unit 46, display an instruction for a temperature setting of an air conditioner of the vehicle 50 on the screen or output the instruction by voice. The control unit 31 transmits the generated control signal to the vehicle terminal 40 via the communication unit 33. In a case where the received message includes an expression showing how hot or cold it is, the control unit 31 may determine the new temperature setting of the air conditioner according to the expression. In this case, the control unit 31 generates a control signal for the control unit 41 of the vehicle terminal 40 so as to, by the output unit 46, display, as the control signal, an instruction for the new temperature setting of the air conditioner of the vehicle 50 on the screen, or output the instruction by voice.

In this example, the control unit 31 of the provider server 30 predicts, from the message including the text "It's hot", that it is necessary to lower the temperature setting of the air conditioner of the vehicle 50. The control unit 31 generates a control signal for the control unit 41 of the vehicle terminal 40 so as to, by the output unit 46, display a message saying "Please lower the temperature setting of the air conditioner" on the screen, or output the message by voice.

In step S113, the control unit 41 of the vehicle terminal 40 receives the control signal transmitted in step S112 via the communication unit 43. The control unit 41, by the output unit 46, displays the instruction for the temperature setting of an air conditioner of the vehicle 50 on the screen, or outputs the instruction by voice.

In this example, the control unit 41 of the vehicle terminal 40, by the output unit 46, displays the message saying "Please lower the setting temperature of the air conditioner" on the screen, or outputs the message by voice. Accordingly, the driver of the vehicle 50 can appropriately adjust the temperature setting of the air conditioner of the vehicle 50. Further, the processing of steps S108 to S113 may be repeated until the temperature inside the vehicle 50 reaches the temperature desired by the user.

As one example, in the following steps, the vehicle 50 reaches the destination and the user alights from the vehicle 50.

In step S114, in a case where the search signal is no longer received from the vehicle terminal 40 via the communication unit 13, the control unit 11 of the user terminal 10 cancels the registration, as the chatting partner, of the dialogue agent of the vehicle 50 or the dialogue agent of the business operator who provides the service for dispatching the vehicle 50.

In this example, in a case where the search signal (e.g., beacon) is not received any more from the vehicle terminal 40 via the communication unit 13, using a technology such as Bluetooth® or Wi-Fi®, the control unit 11 of the user terminal 10 cancels the registration of the dialogue agent of the vehicle 50 or the dialogue agent of the business operator who provides the service for dispatching the vehicle 50. Accordingly, the dialogue agent of the vehicle 50 or the dialogue agent of the business operator who provides the service for dispatching the vehicle 50 is not displayed as the chatting partner.

In step S115, the control unit 31 of the provider server 30 estimates a user satisfaction index for the onboard service based on the messages transmitted and received between the user terminal 10 and the provider server 30 while the user is in the vehicle 50. The control unit 31 transmits information on the estimated user satisfaction index to the vehicle terminal 40 via the communication unit 33.

In this example, the storage unit 32 of the provider server 30 stores data in which a correlation between the user satisfaction index for the onboard service and the number of times the user has transmitted and received the messages before a predetermined user request is fulfilled, or to a specific expression being included in the message input by the user, is defined in advance. Further, in a case where the number of times the user has transmitted and received the messages is large before the predetermined user request is realized, it is considered that the user request is not easily fulfilled and the user satisfaction index for the onboard service is low. Moreover, in a case where the message includes a positive expression such as "comfortable", it is considered that the user satisfaction index for the onboard service is high. The control unit 31 of the provider server 30 specifies, based on the data acquired from the storage unit 32, the user satisfaction index for the onboard service, which corresponds to the number of times the user has transmitted and received the messages before the user request of the user who has boarded the vehicle 50 is fulfilled, or to a specific expression being included in the message input by the user. The control unit 31 of the provider server 30 estimates the user satisfaction index for the specified onboard service as the user satisfaction index for the onboard service of the user who has boarded the vehicle 50. Furthermore, the control unit 31 of the provider server 30 may estimate the user satisfaction index for the onboard service according to a conversation between the user and a third party (e.g., his/her friend) after the user has alighted from the vehicle, instead of the messages transmitted and received between the user terminal 10 and the provider server 30. In this case, the control unit 31 estimates the user satisfaction index for the onboard service based on information, which is acquired from the SNS server 20 via the communication unit 33 including the conversation between the user and a third party (e.g., his/her friend) after the user has alighted from the vehicle.

In step S116, the control unit 41 of the vehicle terminal 40 receives the information indicating the user satisfaction index transmitted in step S115 via the communication unit 43. The control unit 41, by the output unit 46, displays the information indicating the user satisfaction index on the screen or outputs the information by voice.

As described above, in the present embodiment, provided is a program causing the computer used by the user to execute providing the chat function for transmitting and receiving the message between the user and the registered chatting partner and allowing the user, while the user is in the vehicle 50, to transmit and receive the message to and from the predetermined chatting partner, who is associated with the vehicle 50, by using the chat function. In the example illustrated in FIG. 6, the program causes the user terminal 10, corresponding to the computer used by the user, to execute providing the chat function for transmitting and receiving the message between the user and the registered chatting partner and allowing the user, while the user is in the vehicle 50, to transmit and receive the message to and from the predetermined chatting partner, who is associated with the vehicle 50, by using the chat function.

According to the present embodiment, the convenience of the onboard service can be enhanced.

In the present embodiment, the program causes the computer used by the user to execute registering the predetermined chatting partner while the user is in the vehicle 50. In the example of FIG. 6, the program causes the user terminal 10, corresponding to the computer used by the user, to execute, while the user is in the vehicle 50, registering the chatting partner including the dialogue agent of the vehicle 50 or the dialogue agent of the business operator who provides the service for dispatching the vehicle 50.

According to the present embodiment, the convenience of the onboard service can be enhanced.

As a modified example of the present embodiment, the program may cause a computer used by the user to execute registering the predetermined chatting partner before the user boards the vehicle 50. For example, the program may cause the user terminal 10, corresponding to the computer used by the user, to execute registering the chatting partner including the dialogue agent of the vehicle 50 or the dialogue agent of the business operator who provides the service for dispatching the vehicle 50 before the user boards the vehicle 50. In particular, the user uses the user terminal 10 to make a reservation for vehicle dispatch through a program for allocating a vehicle, which is provided by the business operator who provides the service for dispatching the vehicle 50. In this case, the control unit 31 of the provider server 30 generates, by the communication unit 33, a registration request for registering, as the chatting partner, the dialogue agent of the vehicle 50 or the dialogue agent of the business operator who provides the service for dispatching the vehicle 50. The control unit 31 transmits the generated registration request to the user terminal 10 via the communication unit 33. The control unit 11 of the user terminal 10 receives the registration request transmitted via the communication unit 13. The control unit 11, by the output unit 16, displays the registration request on the screen or outputs the registration request by voice. The control unit 11 receives, by the input unit 15, a reply showing whether the user can handle with the registration request. When the user replies that he/she can handle the registration request, the dialogue agent of the vehicle 50 or the dialogue agent of the business operator who provides the service for dispatching the vehicle 50 is registered as the chatting partner. The subsequent processing is the same as the processing after step S101 in the example of FIG. 6.

According to the modified example, the convenience of the onboard service can be enhanced.

In the present embodiment, the program causes the computer used by the user to execute canceling the registration of the predetermined chatting partner after the user alights from the vehicle 50. In the example of FIG. 6, the program causes the user terminal 10, corresponding to the computer used by the user, to execute canceling the registration of the chatting partner including the dialogue agent of the vehicle 50 or the dialogue agent of the business operator who provides the service for dispatching the vehicle 50 after the user alights from the vehicle 50.

According to the present embodiment, the dialogue agent of the vehicle 50 which the user happened to board, or the dialogue agent of the business operator who provides the service for dispatching the vehicle 50 does not remain in a list of the chatting partners. Therefore, the user does not feel annoyed and the convenience of the onboard service is further enhanced.

As a modified example of the present embodiment, the program may cause the computer used by the user to execute hiding the messages transmitted and received between the user and the predetermined chatting partner after the user alights from the vehicle 50. For example, the program causes the user terminal 10, corresponding to the computer used by the user, to execute hiding the messages transmitted and received between the user and the predetermined chatting partner including the dialogue agent of the vehicle 50 or the dialogue agent of the business operator who provides the service for dispatching the vehicle 50 after the user alights from the vehicle 50. In particular, the program causes the user terminal 10, corresponding to the computer used by the user, to execute moving the messages transmitted and received between the user and the predetermined chatting partner including the dialogue agent of the vehicle 50 or the dialogue agent of the business operator who provides the service for dispatching the vehicle 50 to a hidden list in the chat function for transmitting and receiving the message between the user and the registered chatting partner.

According to the modified example, the message transmitted to/received from the dialogue agent of the vehicle 50 which the user happened to board, or the dialogue agent of the business operator who provides the service for dispatching the vehicle 50 does not remain in a list of conversations. Therefore, the user does not feel annoyed and the convenience of the onboard service is further enhanced.

In the present embodiment, the program causes the computer used by the user to execute transmitting, as the message, the message indicating the user request, using the chat function. In the example of FIG. 6, the program causes the user terminal 10, corresponding to the computer used by the user, to execute transmitting the message including the user request including a request regarding a destination, or a request regarding the environment inside the vehicle 50, such as temperature, humidity, air volume, or wind direction.

According to the present embodiment, the user can inform the driver of his/her request by the dialogue agent of the vehicle 50 or the dialogue agent of the business operator who provides the service for dispatching the vehicle 50, thus the convenience of the onboard service is further enhanced.

In the present embodiment, the control device includes the control unit 31 and the communication unit 33. While the user is in the vehicle 50, the control unit 31 transmits a control signal to the vehicle terminal 40 used in the vehicle 50, via the communication unit 33. The control signal is generated based on the message transmitted from the user to the predetermined chatting partner associated with the vehicle 50. In the example of FIG. 6, the provider server 30 corresponding to the control device includes the control unit 31 and the communication unit 33. While the user is in the vehicle 50, the control unit 31 transmits a control signal to the vehicle terminal 40 used in the vehicle 50, via the communication unit 33. The control signal is generated based on the message transmitted from the user to the predetermined chatting partner associated with the vehicle 50.

According to the present embodiment, the convenience of the onboard service can be enhanced.

In the present embodiment, the control unit 31 of the control device transmits, to the vehicle terminal 40 used in the vehicle 50, as the control signal, a control signal according to the user request predicted from the message transmitted by the user to the predetermined chatting partner associated with the vehicle 50, via the communication unit 33. In the example illustrated in FIG. 6, the control unit 31 of the provider server 30, corresponding to the control device, transmits, to the vehicle terminal 40 used in the vehicle 50, as the control signal, a control signal according to the user request including a request regarding a destination, or a request regarding the environment inside the vehicle 50, such as temperature, humidity, air volume, or wind direction, which is predicted from the message transmitted by the user to the predetermined chatting partner associated with the vehicle 50, via the communication unit 33.

According to the present embodiment, the driver of the vehicle 50 can understand the user request, and thus the convenience of the onboard service is further enhanced.

As a modified example of the present embodiment, the control unit 31 of the control device, while the user is in the vehicle 50, may transmit the control signal to the vehicle 50, via the communication unit 33, in which the control signal is generated based on the message transmitted from the user to the predetermined chatting partner associated with the vehicle 50. The control unit 31 may transmit to the vehicle 50, as the control signal, the control signal according to the user request including a request regarding a destination, or a request regarding the environment inside the vehicle 50, such as temperature, humidity, air volume, or wind direction, which is predict from the message transmitted by the user to the predetermined chatting partner associated with the vehicle 50, via the communication unit 33. For example, when the message includes the user request regarding a destination, the control unit 31 of the provider server 30, corresponding to the control device, may transmit to the vehicle 50 a control signal for controlling a traveling route of the vehicle 50 via the communication unit 33. Further, in a case where the message includes the user request regarding the environment inside the vehicle 50, such as temperature, humidity, air volume, or wind direction, the control unit 31 of the provider server 30, corresponding to the control device, may transmit, to the vehicle 50, a control signal for controlling temperature settings, humidity settings, air volume settings, or wind direction settings of the air conditioner of the vehicle 50, via the communication unit 33.

The present disclosure is not limited to the embodiments described above. For example, a plurality of blocks described in the block diagram may be integrated, or a single block may be divided into several blocks. Instead of executing the steps described in the flowchart in chronological order according to the description, the steps may be executed in parallel or in a different order depending on the processing capability of the device executing the steps, or as necessary. Other changes or modifications can be made without departing from the scope of the present disclosure.

What is claimed is:

1. A program causing a computer used by a user to execute an operation comprising:

providing a chat function for transmitting and receiving a message between the user and a registered chatting partner;

reading an identification information including a QR code of a predetermined chatting partner displayed on a display of a vehicle while the user is in the vehicle;

registering the predetermined chatting partner of the vehicle by the user;

allowing the user, while the user is in the vehicle, to transmit and receive a message to and from the predetermined chatting partner, who is associated with the vehicle, by using the chat function; and transmitting, as the message, a message indicating a request of the user, using the chat function, wherein the request of the user includes a request regarding an environment inside the vehicle.

2. The program according to claim 1, wherein the operation further comprises canceling the registration of the predetermined chatting partner after the user alights from the vehicle.

3. The program according to claim 1, wherein the operation further comprises hiding the message transmitted or received between the user and the predetermined chatting partner after the user alights from the vehicle.

4. The program according to claim 1, wherein the predetermined chatting partner includes a dialogue agent of the vehicle or a dialogue agent of a business operator who provides a service for dispatching the vehicle.

5. The program according to claim 1, wherein the request of the user further includes a request regarding a destination.

6. The program according to claim 1, wherein the environment includes temperature, humidity, air volume, or wind direction.

7. A control device comprising:

a control unit; and a communication unit, wherein the control unit is configured to:

display an identification information including a QR code of a predetermined chatting partner;

allow an user while the user is in a vehicle to read the identification information of the predetermined chatting partner;

register the predetermined chatting partner of the vehicle by the user; and transmit a control signal to the vehicle terminal used in a vehicle or to the vehicle, via the communication unit, the control signal being generated based on a message transmitted, while a user is in the vehicle, from the user to the predetermined chatting partner associated with the vehicle; the message from the user indicating a request from the user, wherein the request of the user includes a request regarding an environment inside the vehicle.

8. The program according to claim 1, wherein the operation further comprises transmitting the user request predicted from the message transmitted by the user to the predetermined chatting partner.

9. The program according to claim 1, wherein the operation further comprises determining a temperature that the user desires inside the vehicle based on the message or an expression included in the message received from the user.

10. The program according to claim 1, wherein the operation further comprises displaying the request received from the user about the environment inside the vehicle.

11. The control device according to claim 7, wherein the environment includes temperature, humidity, air volume, or wind direction.

12. The control device according to claim 11, wherein the control unit is configured to transmit, as the control signal, a control signal according to a request of the user that is predicted from the message to the vehicle terminal or the vehicle, via the communication unit.

13. The control device according to claim 12, wherein the request of the user further includes a request regarding a destination.

14. The control device according to claim 11, wherein the control unit is configured to transmit the user request predicted from the message transmitted by the user to the predetermined chatting partner.

15. The control device according to claim 11, wherein the control unit is configured to display the request received from the user about the environment inside the vehicle.

16. A control method executed by a computer used by a user, the control method comprising:
providing a chat function for transmitting and receiving a message between the user and a registered chatting partner;
reading an identification information including a QR code of a predetermined chatting partner displayed on a display disposed in a vehicle while the user is in the vehicle;
registering the predetermined chatting partner of the vehicle by the user;
allowing the user, while the user is in the vehicle, to transmit and receive a message to and from the predetermined chatting partner, who is associated with the vehicle, by using the chat function; and
transmitting, as the message, a message indicating a request of the user, using the chat function,
wherein the request of the user includes a request regarding an environment inside the vehicle.

17. The control method according to claim 16, further comprising canceling the registration of the predetermined chatting partner after the user alights from the vehicle.

18. The control method according to claim 16, further comprising hiding the message transmitted or received between the user and the predetermined chatting partner after the user alights from the vehicle.

19. The control method according to claim 16, further comprising transmitting the user request predicted from the message transmitted by the user to the predetermined chatting partner.

20. The control method according to claim 16, further comprising displaying the request received from the user about the environment inside the vehicle.

* * * * *